United States Patent
Ellis et al.

(10) Patent No.: US 9,462,796 B1
(45) Date of Patent: Oct. 11, 2016

(54) COOLER AND TACKLE BOX

(71) Applicants: Bruce G. Ellis, Kingston, GA (US); Janet C. Ellis, Kingston, GA (US)

(72) Inventors: Bruce G. Ellis, Kingston, GA (US); Janet C. Ellis, Kingston, GA (US)

(*) Notice: Subject to any disclaimer, the term of this patent is extended or adjusted under 35 U.S.C. 154(b) by 23 days.

(21) Appl. No.: 14/535,862

(22) Filed: Nov. 7, 2014

Related U.S. Application Data

(60) Provisional application No. 61/934,097, filed on Jan. 31, 2014.

(51) Int. Cl.
*A01K 97/22* (2006.01)
*A01K 97/06* (2006.01)
*A01K 97/04* (2006.01)
*A47C 7/62* (2006.01)
*A47C 15/00* (2006.01)

(52) U.S. Cl.
CPC ............ *A01K 97/22* (2013.01); *A01K 97/04* (2013.01); *A01K 97/06* (2013.01); *A47C 7/62* (2013.01); *A47C 15/004* (2013.01)

(58) Field of Classification Search
CPC ...... A01K 97/22; A01K 97/06; A01K 97/04; A47C 7/62; A47C 15/004
USPC ............. 62/441, 457.7; 43/54.1; 297/188.11, 297/188.1, 217.1, 183.1; 190/33, 39, 35
See application file for complete search history.

(56) References Cited

U.S. PATENT DOCUMENTS

| | | | |
|---|---|---|---|
| 2,357,214 A | 8/1944 | McDole | |
| 2,812,227 A * | 11/1957 | Hill | 312/290 |
| 4,014,128 A | 3/1977 | Hrdlicka | |
| 4,095,364 A | 6/1978 | Prine | |
| 4,128,170 A | 12/1978 | Elliott | |
| 4,208,826 A * | 6/1980 | Lindaman | 43/57.1 |
| 4,768,651 A * | 9/1988 | Lanius | 206/315.11 |
| 4,925,245 A * | 5/1990 | Pendleton et al. | 297/440.1 |
| 5,209,009 A | 5/1993 | Fast | |
| 5,335,759 A * | 8/1994 | Yeh | 190/115 |
| 5,864,981 A | 2/1999 | Zeman | |
| 6,370,810 B1 * | 4/2002 | Widerman | 43/21.2 |
| 6,446,382 B1 | 9/2002 | Cloutier et al. | |
| D479,770 S | 9/2003 | Smith, Sr. et al. | |
| D574,668 S | 8/2008 | Kelly | |
| 7,415,794 B1 * | 8/2008 | Thompson | 43/54.1 |
| 2007/0101754 A1 * | 5/2007 | Maldonado | 62/389 |
| 2010/0275642 A1 * | 11/2010 | Klettner | 62/457.7 |

OTHER PUBLICATIONS http://www.overtons.com/modperl/product/details.cgi?pdesc=Plano-Chill-Bag-System-Tackle-Box&i=441793. (Pub. date unknown, Accessed Jul. 17, 2013).

* cited by examiner

*Primary Examiner* — Milton Nelson, Jr.
(74) *Attorney, Agent, or Firm* — Robert C. Montgomery; Montgomery Patent & Design L.P.

(57) ABSTRACT

A cooler and tackle box combination includes a compartmentalized utility box, having a cooler section, a bait storage section, and a caddy section. The cooler section is provided with a cushioned seat attached to a top portion thereof. The cooler section is insulated and used to store and transport items desired to be maintained at certain temperatures. The caddy section is provided with trays and drawers to hold a plurality of tackle, fishing, or hunting gear. An outer side surface of the box is provided with a plurality of fastening mechanisms to removably secure fishing rods. The box is provided with an elongated pivoting and extendable handle and a plurality of wheels for transport.

20 Claims, 9 Drawing Sheets

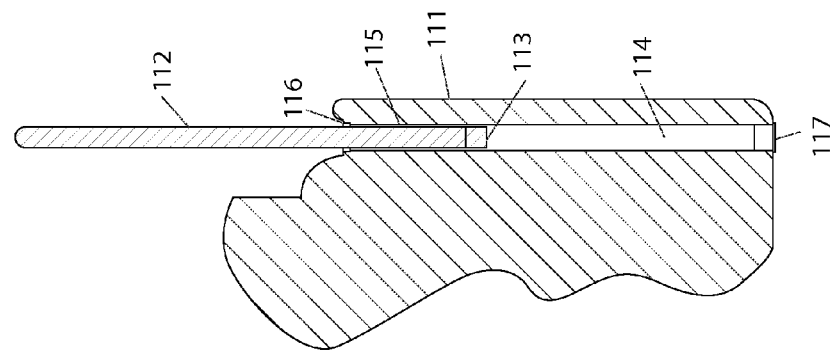
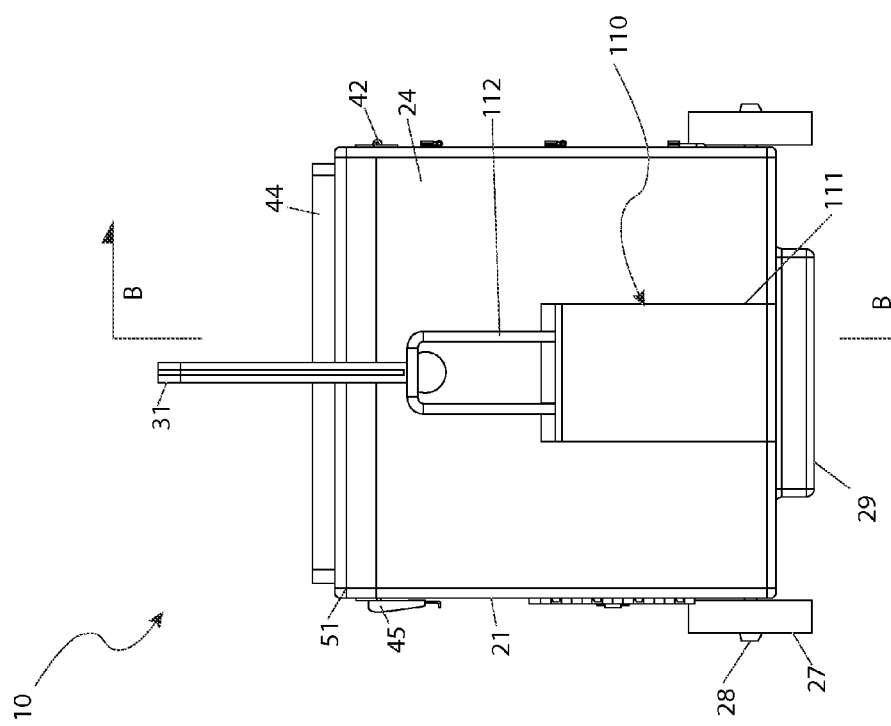

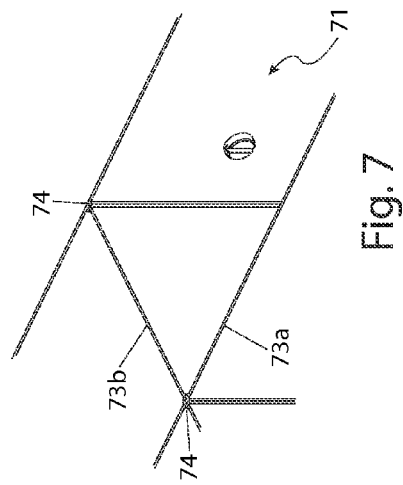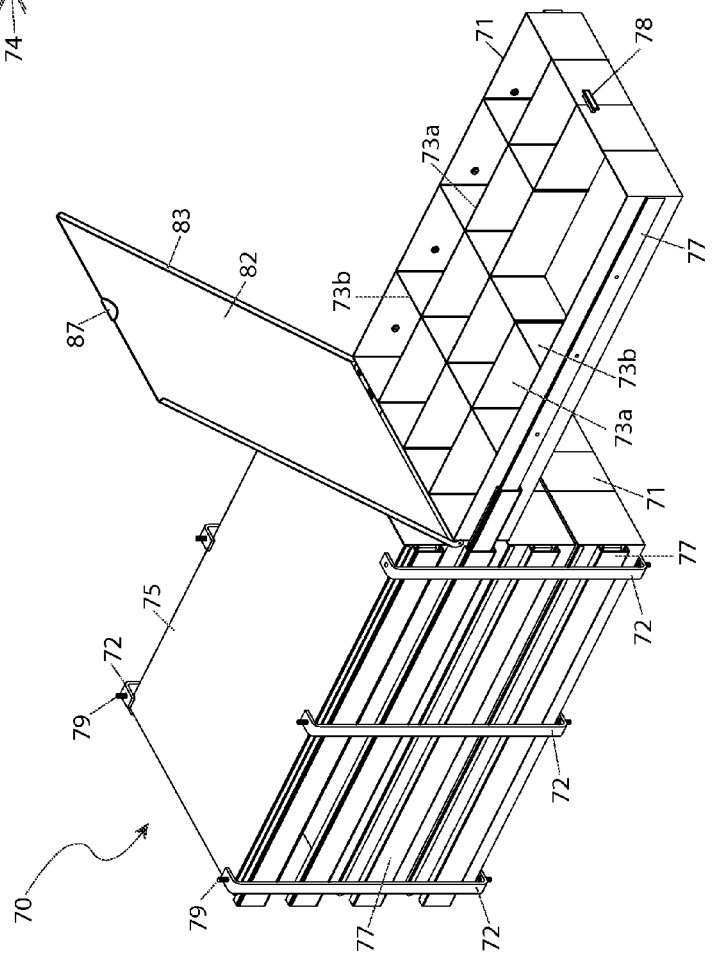

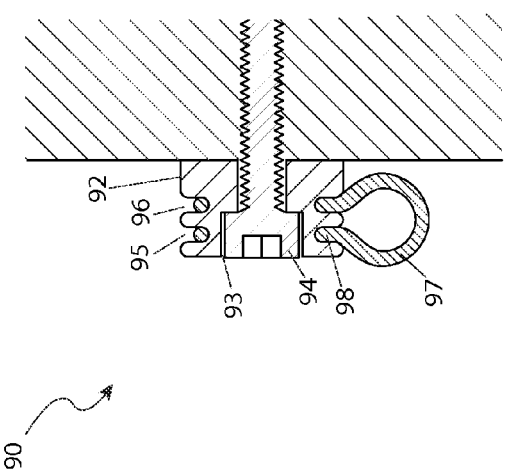
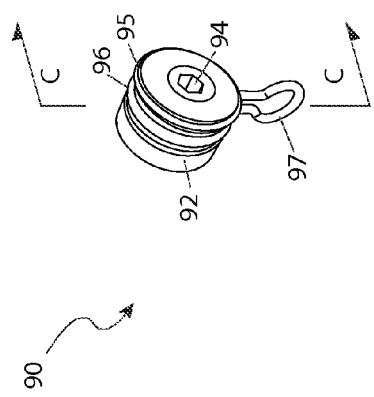
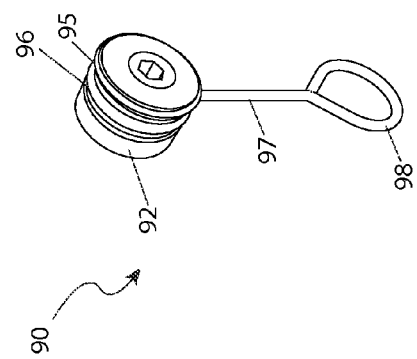

COOLER AND TACKLE BOX

RELATED APPLICATIONS

The present invention was first described in and claims the benefit of U.S. Provisional Application No. 61/934,097, filed Jan. 31, 2014, the entire disclosures of which are incorporated herein by reference.

FIELD OF THE INVENTION

The present invention relates generally to an apparatus that functions as a combination cooler and tackle box.

BACKGROUND OF THE INVENTION

Fishing is an intricate activity that encompasses many thousands of styles of equipment and strategies. The list of common equipment that is necessary to enjoy and succeed at fishing is seemingly endless. This list includes fishing poles, tackle boxes, bait boxes, chairs, hooks, rods, sinkers, bobbers, bait, lures, and the like. The long list of equipment and supplies that the fisherman has to carry sometimes creates a burden that can tend to spoil that enjoyment, calmness, and simplicity that are associated with fishing. While a fishing tackle box provides a great means of organizing such fishing materials and supplies, depending on the user's methods and intent, a cooler must be carried separately. Each of these devices provides different benefits in terms of permanent storage for inanimate accessories for the tackle box versus refreshments and a space to hold the caught fish for preservation. However, just these two (2) devices already occupy the available hands of a single fisherman additional items, such as rods and chairs, quickly become unduly cumbersome when attempting to transport their equipment to a fishing spot. This is doubly true in the cases where the fisherman's point of arrival is distant from their fishing spot or when the fisherman likes to move about on a regular basis, particularly in dark conditions. Accordingly, there is a need for a combination cooler and tackle box by which a fisherman can easily and effectively store and transport all of the necessary angling equipment in a manner that overcomes the problems above. The development of the cooler fulfills this need.

The device is a combination cooler and tackle box specifically configured to compartmentalize storage areas within a cavity portion thereof. The storage areas comprise a cooler compartment, a bait compartment, and a tackle compartment. Each compartment is separate and distinct so as to prevent infiltration of items and fluids from one (1) compartment to the other. At least the cooler compartment is insulated to impede heat transfer into and out from the cavity defined by that compartment. Each compartment is provided with a hinged lid or door that is secured by a latch. At least one (1) top lid is further provided with cushions for comfortable seating. Other features of the device include transport wheels, an extendable pull handle, pull-out tackle box drawers, and a drain. A plurality of rod holders is disposed on an outer surface of the device to removably retain at least one (1) fishing rod. The tackle box drawers further enable reconfiguration of storage sections within the drawers to accommodate items of various sizes.

Prior art in this field consists of coolers that double as a tackle box but such devices fail to isolate the compartments adequately to prevent infiltration of items and fluids from one compartment to the other. A further disadvantage exhibited by the prior art is the requirement to stack the tackle on top of the cooler region so as to force a user to remove tackle before gaining access to the cooler.

It is an objective of the present invention to provide a chest that serves as cooler, a bait holder, and a tackle box in one (1) convenient unit.

It is a further objective of the present invention to enable isolation of each holding region without detracting from access to each region and ease of use of the unit.

It is a further objective of the present invention to provide a pullout drawer assembly to the tackle box section to enable greater accessibility and storage capacity.

It is a further objective of the present invention to afford the ability to reconfigure the pullout drawer assembly to accommodate various sized and shaped tackle.

It is a further objective of the present invention to equip the chest with a wheel assembly and a carry handle to assist with maneuverability of the device.

It is a further objective of the present invention to provide a means to carry fishing rods along an exterior of the chest.

It is a further objective of the present invention to enable the top of the chest to double as a cushioned seat and a lid for the device.

SUMMARY OF THE INVENTION

The device is a combination cooler and tackle box comprising a cooler chest with a plurality of lids hingedly attached to a top portion thereof. Sidewalls of the cooler chest are insulated to impede heat transfer. The cooler chest is divided into a cooler compartment, a bait compartment, and a tackle box compartment. This bait compartment has a bait insert to serve as a tray for the bait compartment. Subjacent to the bait compartment is a tackle box, which is accessed via a tackle box door hingedly attached to a side portion of the cooler chest. A tackle box drawer is disposed within the tackle box and slidably extends and retracts from the tackle box. The tackle box drawer has reconfigurable compartment sections to enable a user to tailor the size and shape of the compartment sections to accommodate various sized and shaped tackle equipment.

Pivotally attached to an outer surface of the cooler chest is a carrying handle that is also extendable and retractable. A bottom of the cooler chest is equipped with a wheel assembly and a stand. The wheel assembly assists a user in transporting the device while pulling it with the carrying handle. The stand supports the device in a level orientation due to the rise in elevation that the wheels create at one (1) end of the device. A cushion seat is disposed on at least one (1) of the top lids to provide a seating surface. A drain is formed into a sidewall of the cooler chest, and is preferably located within the cooler compartment. This drain is further provided with a plug to selectively permit flow of fluids from within the cooler compartment and to the outside of the device. A plurality of rod holders is disposed on an outer surface of the device to removably retain at least one (1) fishing rod via elastic ties.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4 is a right side elevation view of the combination cooler and tackle box 10 in accordance to the preferred embodiment of the present invention;

FIG. 5 is a section view along line B-B as shown on FIG. 4 cut through the extendable handle assembly 90 of the combination cooler and tackle box 10 in accordance to the preferred embodiment of the present invention;

FIG. 6 is an isolated view of a drawer insert 70 of the combination cooler and tackle box 10 depicted with a tackle box drawer 71 slid out and a drawer lid 82 pivoted open in accordance with the preferred embodiment of the present invention;

FIG. 7 is a detail view of the features in a tackle box drawer 71 of the combination cooler and tackle box 10 in accordance with the preferred embodiment of the present invention;

FIG. 11 is a detail view of a fishing rod holder 90 of the combination cooler and tackle box 10 in accordance with the preferred embodiment of the present invention;

FIG. 12 is a detail view of a fishing rod holder 90 with a tie 97 and an eye 98 extended for the combination cooler and tackle box 10 in accordance with the preferred embodiment of the present invention; and, FIG. 13 is a section view along line C-C as shown in FIG. 11 cut through the rod holder 90 of the combination cooler and tackle box 10 in accordance with the preferred embodiment of the present invention.

Figure 1:
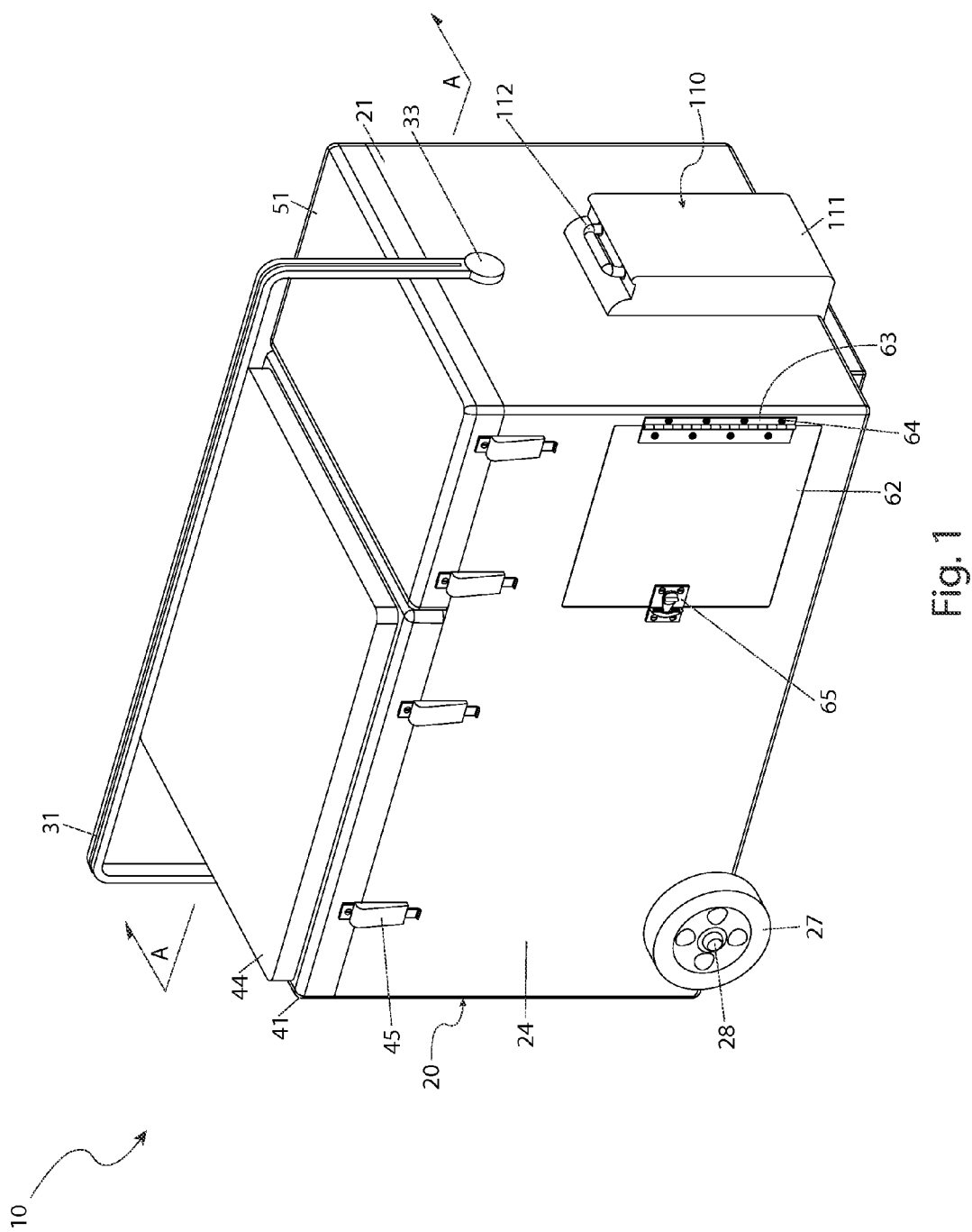
FIG. 1 is a perspective view of a combination cooler and tackle box 10 in accordance with the preferred embodiment of the present invention.

DESCRIPTIVE KEY 10 combination cooler and tackle box
20 cooler chest
21 shell
22 interior
23 cavity
24 sidewall
25 bottom
26 axle
27 wheel
28 hub
29 stand
31 carrying handle
32 handle pivot
33 handle fastener
36 drain
37 drain plug
40 cooler compartment
41 cooler compartment lid
42 lid hinge
43 fastener
44 seat
45 latch assembly
46 latch strike
48 dividing wall
50 bait compartment
51 bait compartment lid
53 bait compartment insert
60 tackle box
62 tackle box door
63 door hinge
64 hinge fastener
65 door latch
68 tackle box roof
69 cavity bottom
70 drawer insert
71 tackle box drawer
72 support post
73a longitudinal drawer divider
73b lateral drawer divider
74 counterfort
75 drawer pivot support
76 pivot aperture
77 drawer slide
78 drawer handle
79 insert fastener
82 drawer lid
83 lid edge
84 lid pivot
85 pivot knuckle
86 pivot pin
87 offset
90 rod holder
92 button
93 button cup
94 button fastener
95 first groove
96 second groove
97 tie
98 eye
100 fishing rod
110 extendable handle assembly
111 handle housing
112 extendable handle
113 extendable handle stop
114 handle slide way
115 handle aperture
116 handle aperture seal
117 slide way plug

DETAILED DESCRIPTION OF THE PREFERRED EMBODIMENT

The best mode for carrying out the invention is presented in terms of its preferred embodiment, herein depicted within FIGS. 1 through 13. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a combination cooler and tackle box (herein referred to as the "device") 10, which provides a means to transport various lures, hooks, sinkers and other items requisite to engage in the sport of fishing, including a certain amount of live bait and fishing rods, with or without attached reels, plus chilled food and/or beverages, and ice from one location to another. Reference in this embodiment to the front of the device 10 will indicated the sidewall 24 opposite of the lid hinges 42. The right side of the device 10 will correspond to the user's right side while standing in front of and facing the device 10.

Figure 2:
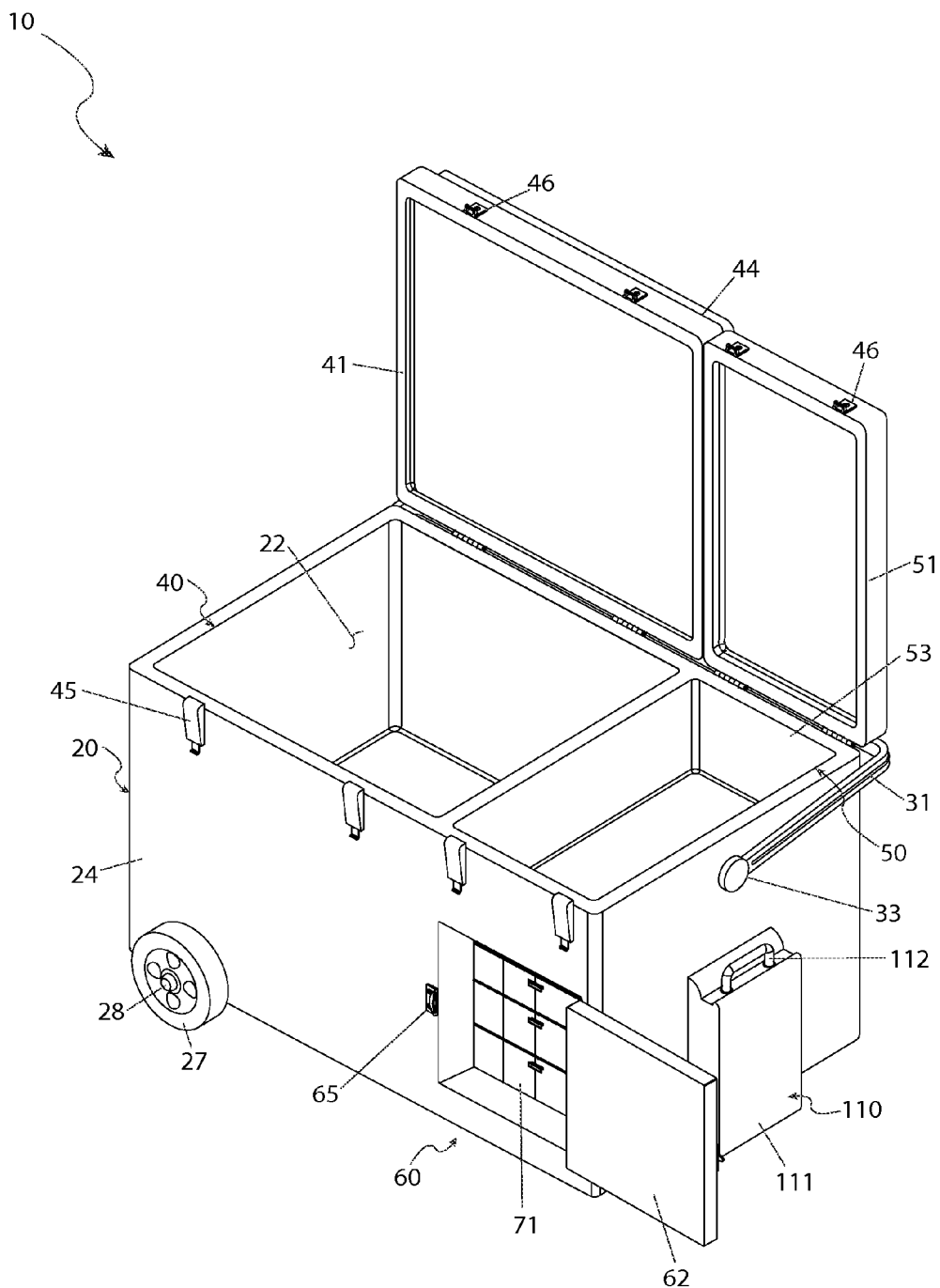
FIG. 2 is a perspective view of the combination cooler and tackle box 10 depicted with a cooler compartment lid 41, a bait compartment lid 51, and a tackle box door 62 open in accordance with the preferred embodiment of the present invention.

Referring now to FIGS. 1 and 2, perspective views of the device 10 in various arrangements, according to the preferred embodiment of the present invention, are disclosed. The device 10 includes a cooler chest 20 configured with an exterior shell 21, an interior 22, and a plurality of hinged, attached lids 41 and 51. The cooler chest 20 includes a bottom 25 and sidewalls 24 which define the interior cavity 22. The bottom 25 and sidewalls 24 are preferably made of a formed thermoplastic material with thermally insulating properties and as such can be presented in a variety of colors. The cooler chest 20 is separated longitudinally into a cooler compartment 40 and a bait compartment 50 by a dividing wall 48. A tackle box 60 is disposed in a cavity 23 subjacent to the bait compartment 50 and is accessed by a tackle box door 62.

The bottom 25 of the cooler chest 20 is of sufficient thickness to adequately support an axle 26. The centerline of the axle 26 is configured to be held perpendicular to the longitudinal axis of the device 10. A wheel 27 approximately six inches (6 in.) in diameter, preferably comprised of a nylon material, is attached to either end of the axle 26 and retained thereon with a hub 28. The wheels 27 provide a means for transporting the device 10 without entirely lifting the device 10. The hub 28 is preferably configured to have an interference spring tab. However, any other type of retention device, or hub, such as a snap ring or a threaded fastener, may be utilized without limiting the scope of the device 10.

Figure 3:
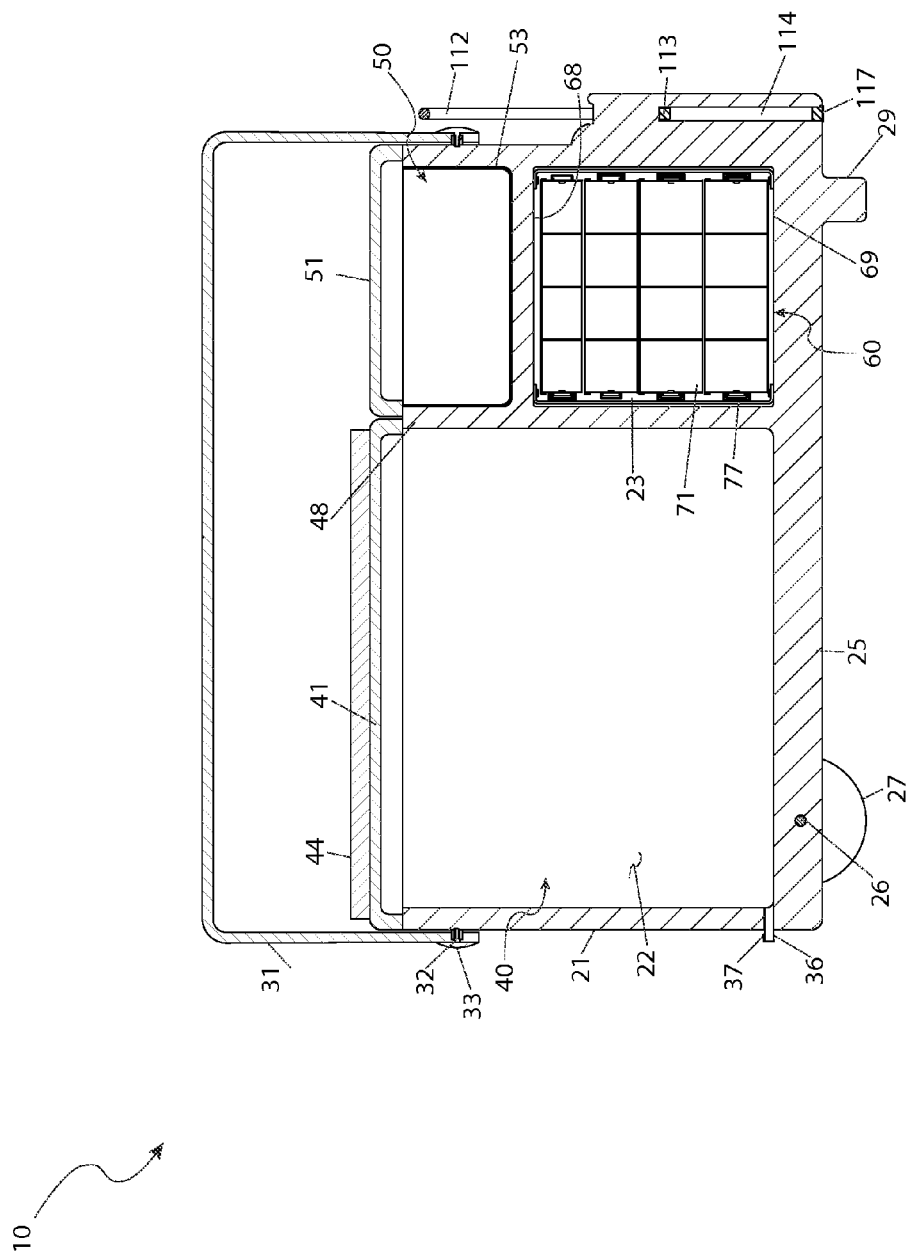
FIG. 3 is a section view along a line A-A as shown on FIG. 1 cut through the combination cooler and tackle box 10 in accordance with the preferred embodiment of the present invention.

A carrying handle 31 is attached to supportive handle pivots 32, as more clearly illustrated in FIG. 3, by means of handle fasteners 33 located on each of the opposing narrow sidewalls 24 for lifting or carrying the device 10. The carrying handle 31 is preferably composed of a rigid thermoplastic material and molded generally as a "C"-shape with a sufficient draw to pivot in front of, or to the rear of, the cooler chest 20 without interfering with the closed lids 41, and 51.

A stand 29 is disposed along at least a portion of a right side edge of the bottom 25 for maintaining the device 10 at a generally level orientation when the device 10 is not being transported.

The cooler chest 20 is provided with a cooler compartment lid 41 and a bait compartment lid 51. These lids 41 and 51 are preferably composed of a formed thermoplastic material with thermally insulating properties in keeping with the sidewalls 24. The cooler compartment lid 41 and the bait compartment lid 51 are pivotally attached to the rear sidewall 24 of the shell 21 by a plurality of lid hinges 42. These lid hinges 42 are attached first to the shell 21 and then to the lids 41 and 51 with threaded fasteners 43 which are preferably composed of an aluminum alloy or another metal with a plating to inhibit corrosion. The lid hinges 42 may be provided with any additional provisions necessary to limit the extent to which lids 41 and 51 are capable of being opened; however, it is understood that any such eventualities do not modify the scope or intent of the present device 10 and this preferred embodiment does not preclude any other embodiment.

A cushioned seat 44, preferably in the form of a vinyl covered foam pad, is attached to at least the cooler compartment lid 41, preferably by means of an adhesive bond, to provide a comfortable place for a user to sit. This cushioned seat 44 may also be attached to the bait compartment lid 51.

A plurality of over-center, spring-biased, latch assemblies 45 is deployed along the upper front sidewall 24 of the shell 21 and can engage the corresponding latch strikes 46 located on the cooler compartment lid 41 and the bait compartment lid 51 to secure those lids 41, 51 in a closed position. The latch assemblies 45 could be comprised of any other suitable latching mechanism, such as hasp-type latches, toggle latches, cam latches, or the like without violating the form of this embodiment.

The cooler compartment 40 includes a drain 36 formed into the shell 21 and which can be plugged with an integrally attached drain plug 37. The drain 36 provides an operable means to dispose of any unwanted liquid from the cooler compartment 40 to the outside of the device 10.

Figure 8:
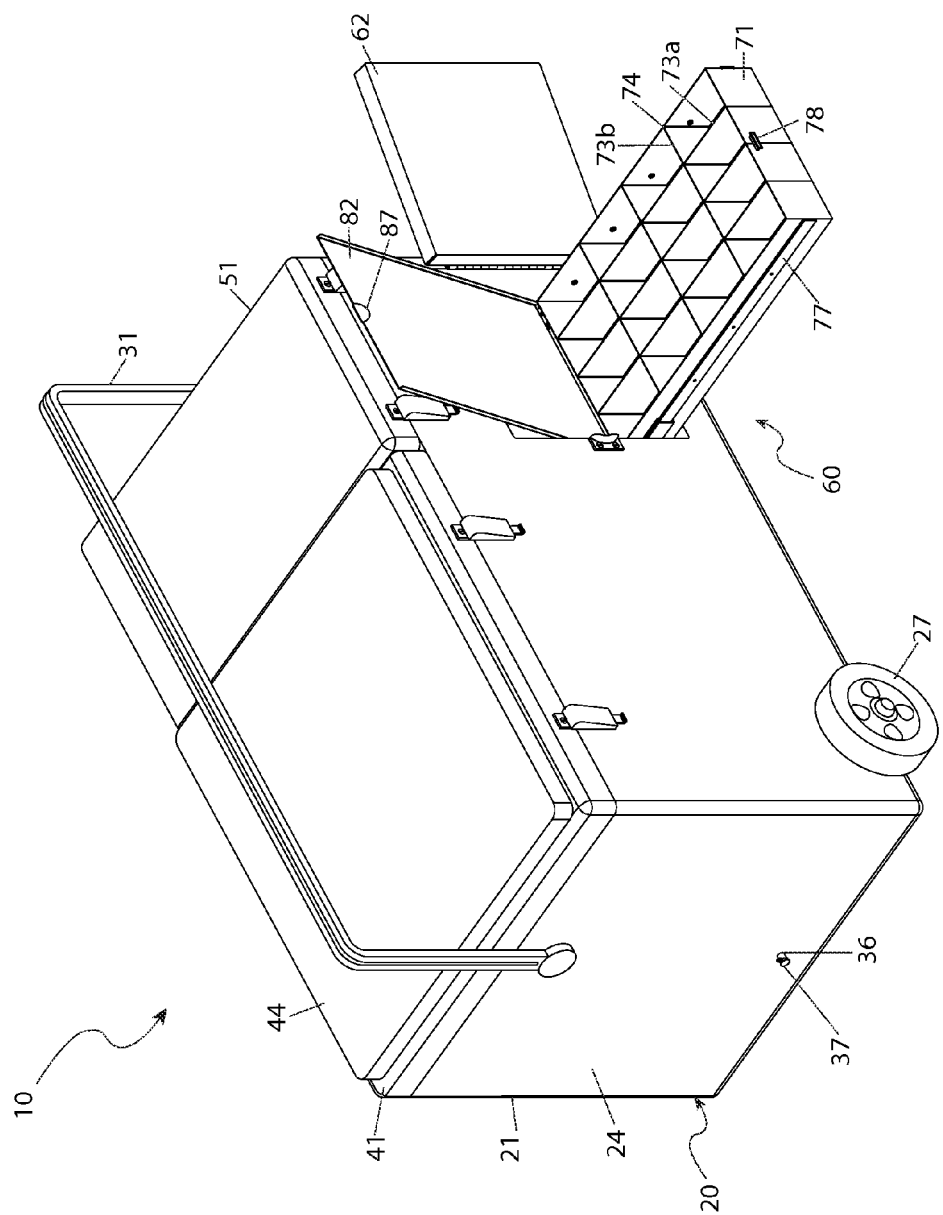
FIG. 8 is a perspective view of the combination cooler and tackle box 10 depicted with another tackle box drawer 71 open in accordance with the preferred embodiment of the present invention.

Disposed upon the front sidewall 24 is the tackle box door 62 which provides access to the tackle box 60, as seen in FIGS. 2 and 8. The tackle box door 62 is pivotally attached to the front sidewall 24 by means of at least one (1) door hinge 63, which is preferably comprised of a non-reactive metal, or a metal with a plating to inhibit corrosion. Other materials may be utilized in the fabrication of the door hinge 63, such as a thermoplastic material, without limiting the scope of the apparatus 10. The door hinge 63 is secured to the tackle box door 62 and the front sidewall 24 by means of a plurality of hinge fasteners 64. The hinge fasteners 64 may be of the same style as the fasteners 43 provided for the lid hinges 42 or may alternately be configured with a different head style without limiting the scope of the device 10. The tackle box door 62 is normally held in the closed position by a door latch 65. The door latch 65 is preferably a cam-type latch, but may be a hasp-type latch, a toggle latch or the like.

Referring now to FIG. 3, a section view along line A-A as seen in FIG. 1 of the device 10, according to the preferred embodiment of the present invention, is disclosed. The bait compartment 50 is preferably located in the space superjacent to the tackle box 60 and is provided for carrying live bait or chum in a separate contained area away from the cooler compartment 40. A bait compartment insert 53 is removably disposed in the bait compartment 50 for the purpose of facilitating the eventual cleaning of the bait compartment 50. The bait compartment insert 53 is preferably fabricated from stainless steel and stamped to conform to the general dimensions of the bait compartment 50. It is understood that other materials, such as alternate metals or a thermoplastic, may be utilized in the fabrication of the bait compartment insert 53 without limiting the scope of the device 10. Furthermore, it is understood that the device 10 may be configured without the bait compartment insert 53, if desired, without limiting the device 10.

Referring now to FIG. 5, a section view along the line B-B, as seen on FIG. 4, according to the preferred embodiment of the present invention, is disclosed. The device 10 includes an extendable handle assembly 110 comprised of a handle housing 111 with a handle slide way 114. An extendable handle assembly 110 is attached to the right sidewall 24 for providing the impetus for motion as well as controlling the direction and speed of travel of the device 10. The handle housing 111 can be integrally molded with the shell 21 during fabrication of the device 10. The extendable handle 112 retracts downwardly within the handle housing 111 when not in use, as seen in FIG. 1, and extends upwardly into the deployed position when in use. The extendable handle 112 includes a pair of vertical supports and a horizontal grip connected between upper ends of the vertical supports. The vertical supports move along the interior vertical handle slide way 114 formed into the handle housing 111. An extendable handle stop 113 is placed horizontally on the ends of the vertical supports of the extendable handle 112 to limit the upward travel of the extendable handle 112. The geometry of the handle slide way 114 in the handle housing 111 is configured to be sufficient to accommodate the extendable handle stop 113 for the majority of the upward travel, but then terminate to limit the travel and keep the extendable handle 112 from becoming dislodged from the handle housing 111. That distance between the terminus of the handle slide way 114 and the top of the handle housing 111 would be provided with two (2) handle apertures 115 to accommodate the vertical supports of the extendable handle 112. The top of the handle apertures 115 are preferably provided with handle aperture seals 116 which would seal around the vertical supports of the extendable handle 112 to exclude debris and moisture from entering the handle slide way 114. The handle aperture seals 116 will provide a sufficient interference fit around the vertical supports of the extendable handle 112 to retain the extendable handle 112 in the up position while also allowing it to easily be pushed downward when not in use. A slide way plug 117 is inserted into the lower open end of the handle slide way 114 after the extendable handle stop 113 is installed on the extendable handle 112 at the time of manufacturing to keep out debris or other foreign matter. It is understood that the device 10 may be configured without the extendable handle assembly 110, if desired, thereby limiting the mode of transportation of the device 10.

Referring now to FIG. 6, an isolated view of a drawer insert 70, and FIG. 8, a perspective view of the device 10, depicted with another tackle box drawer 71 in an open configuration, according to the preferred embodiment of the present invention, are disclosed. Disposed within the cavity 23 of the tackle box 60 is a drawer insert 70. The drawer insert 70 includes at least four (4) support posts 72 from which a plurality of paired drawer slides 77 are suspended. The purpose of these drawer slides 77 is to provide the means of extending the tackle box drawers 71 out of the tackle box 60 for convenient access to the stored items. The drawer slides 77 are a type of slide roller bearing typically manufactured with an outer race, an inner race, and a sliding race complete with captured ball bearings, and an integral stop mechanism to limit the extension of the races. However, roller wheels and formed slide rails could alternately be utilized, among other techniques, as a means of providing the necessary support and mobility for the tackle box drawers 71 without limiting the scope of the device 10. The outer races are attached to the support posts 72 preferably with threaded fasteners while the inner races are attached to the sides of the respective tackle box drawers 71 by a similar means. The support posts 72 are attached to the tackle box roof 68 and the cavity bottom 69 of the tackle box 60 by means of a plurality of threaded insert fasteners 79.

The tackle box drawers 71 are preferably composed of a rigid thermoplastic and formed in an injection molding process. The tackle box drawers can be fabricated from a translucent or an opaque polymer and as such may be presented in a wide variety of colors. The tackle box drawers 71 will generally be of the same width and length, however, the depth may be variable throughout the drawer insert 70 as illustrated in FIG. 6. The tackle box drawers 71 are preferably fabricated with integral counterforts 74, as seen in FIG. 7, to support the insertion of longitudinal drawer dividers 73a as well as lateral drawer dividers 73b. The counterfort 74 is a type of partial wall support buttress that is configured to structurally retain and reinforce a wall, in this case the applicable drawer dividers 73a, and 73b. The longitudinal drawer dividers 73a would additionally be provided with integral counterforts 74 located appropriately to coincide with the locations of counterforts 74 along the walls of the tackle box drawers 71 to retain the lateral drawer dividers 73b. The drawer dividers 73a and 73b may be of a height to exactly match the depth of the tackle box drawer 71 into which the dividers 73a and 73b are inserted, or the may be shorter depending upon the contents and the taste of the user. The drawer dividers 73a and 73b may be inserted as shown in FIG. 8 to evenly transect the space within the tackle box drawer 71. Alternately, any lateral drawer divider 73b may be omitted to create larger sections to accommodate items of a greater size. A longitudinal drawer divider 73a may also be truncated or foreshortened after a pair of counterforts 74 as illustrated in FIG. 4 to create an even larger space. The tackle box drawer 71 may be provided with any relief or reinforcement rib as deemed necessary without limiting the scope of the device 10.

Disposed upon the front of each tackle box drawer 71 is a drawer handle 78 to facilitate the opening and closing thereof. The drawer handle 78 may be any formed thermoplastic, or metal, pull device attached to the tackle box drawer 71 by any suitable means.

Figure 9:
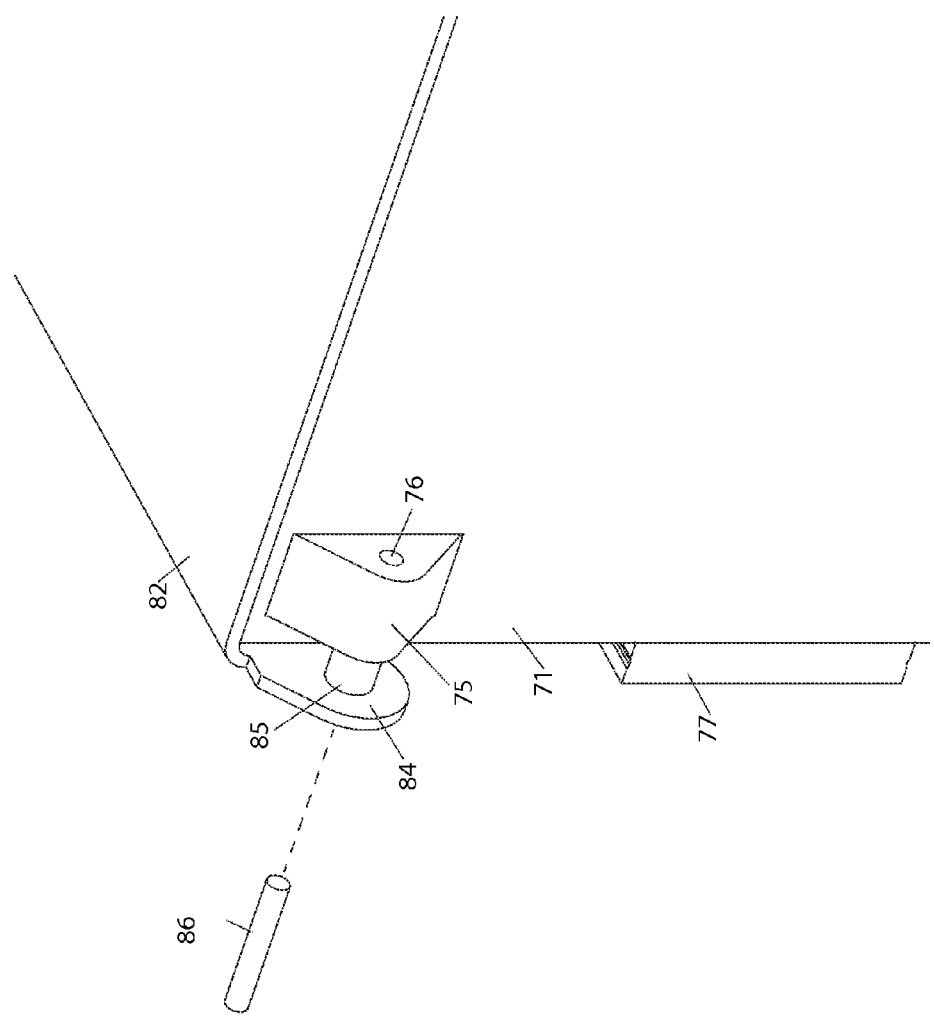
FIG. 9 is a detail view of a drawer lid pivot 76 of the combination cooler and tackle box 10 in accordance with the preferred embodiment of the present invention.

Located on the rear of each tackle box drawer 71 is a matched pair of drawer pivot supports 75 as seen in FIG. 9. These drawer pivot supports 75 are configured to be projections of the rear wall of the tackle box drawer 71. The drawer pivot supports 76 are provided with pivot apertures 76 into which a pivot pin 86 is engaged with a sliding fit. The pivot pin 86 is disposed in the pivot knuckle 85 attached to the drawer lid 82. The drawer lid 82 lies over the top of the tackle box drawer 71 to cover the contents therein. This drawer lid 82 is primarily intended to restrain the contents of the tackle box drawer 71 from being dislodged while the device 10 is being jostled such as during transport. The drawer lid 82 is preferably a molded thermoplastic part configured to be generally planar with the lid edges 83 turned down perpendicularly to the top. The lid edges 83 are extended toward the rear of the tackle box drawer 71 and further developed into a lid pivot 84 to incorporate a pivot knuckle 85. The pivot knuckle 85 is generally a cylinder into which a first end of the pivot pin 86 is pressed. The pivot pin 86 is thus secured in the pivot knuckle 85 while the second end is engaged into the pivot aperture 76 of the corresponding drawer pivot support 75. In this configuration the drawer lid 82 can be pivoted to an open position allowing access to the contents of the tackle box drawer 71 or to a closed position. Disposed along the front edge of the drawer lid 82 is an offset 87 which is a slightly raised indentation that would separate a portion of the drawer lid 82 from the tackle box drawer 71 to permit a finger hold for raising the drawer lid 82.

Figure 10:
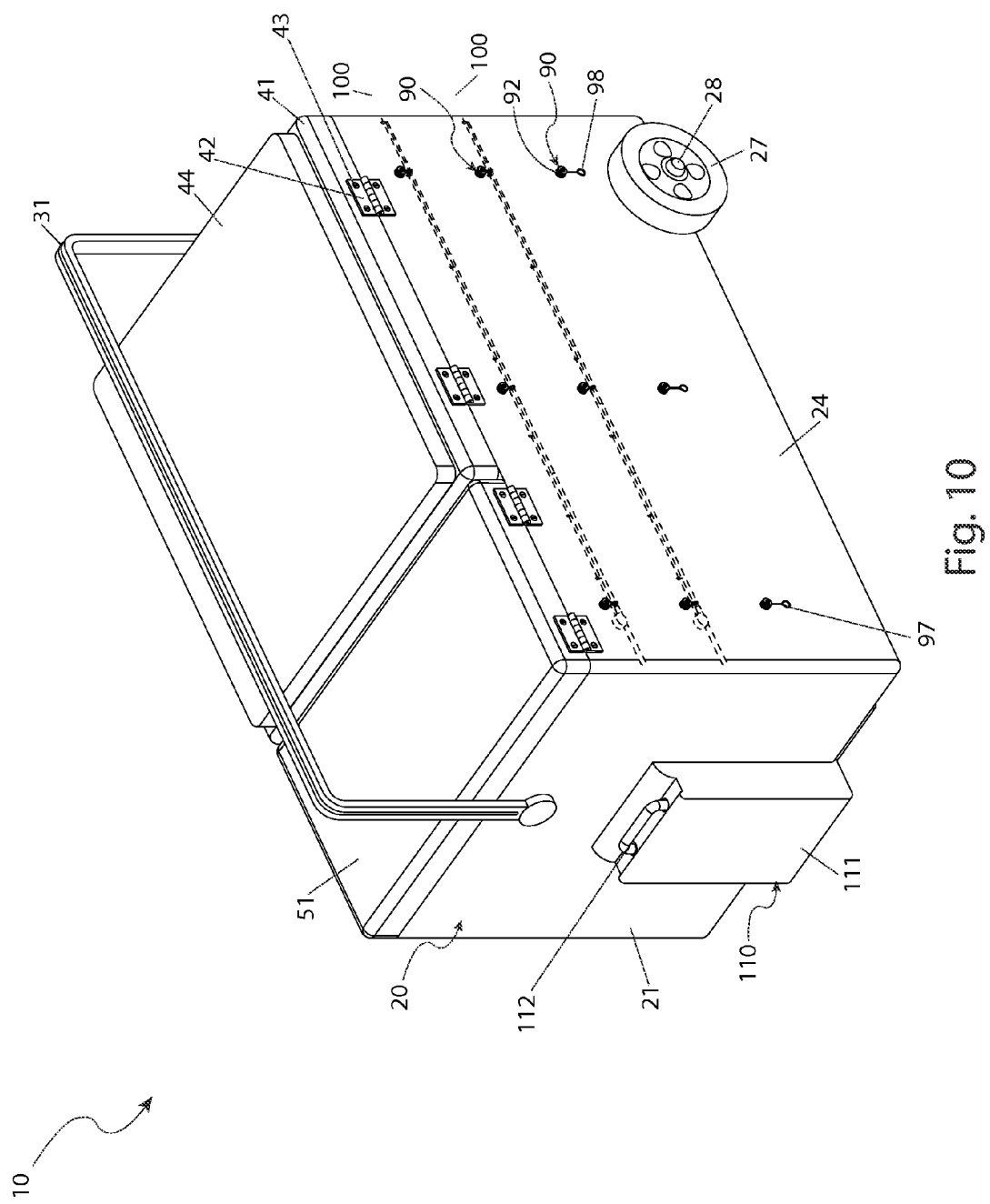
FIG. 10 is a perspective view of the rear of the combination cooler and tackle box 10 illustrating a system of rod holders 90 in accordance with the preferred embodiment of the present invention.

Referring now to FIG. 10, a perspective view of the rear of the device 10, and FIGS. 8a and 8b, detail views of a rod holder 90 of the device 10, according to the preferred embodiment of the present invention, are disclosed. Disposed along the exterior of the rear sidewall 24 is a plurality of rod holders 90 arranged in at least two (2) vertically aligned rows and having at least two (2) rod holders 90 in each row. The rod holders 90 are configured as buttons 92 having a modified cylindrical shape. The buttons 92 are preferably composed of a molded, rigid thermoplastic material. It is understood that different materials, such as a metal casting, could also be utilized without limiting the scope of the device 10. Each button 92 has a through hole with a countersunk button cup 93 at a first end as seen in FIG. 13. The countersunk button cup 93 would preferably accommodate a threaded button fastener 94 with a socket head. The button fastener 94 would be used to secure the rod holders 90 to the sidewall 24. Disposed on the outer diameter of the button 92 are a first groove 95 and a second groove 96. An elastic tie 97 is fixed in the second groove 96 by having a first end permanently attached, or molded, to a portion of the length so as to form a restrictive loop. A second end of the tie 97 would be configured to have an eye 98. This eye 97 would be a somewhat less restrictive loop which could be expanded to deform around the outside diameter of the button 92 and then relax to fit into the first groove 95 so as to have formed an encircling wrap around an extended cylindrical object such as a fishing rod 100. In this manner fishing rods 100 could be removable secured to the device 10 so as to be coincidentally transported on the fishing expedition.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized in a simple and straightforward manner with little or no training. After initial purchase or acquisition of the apparatus 10, it would be configured as indicated in FIG. 1.

The method of utilizing the apparatus 10 may be achieved by performing a series of steps. It can be appreciated that the operational steps may be performed in alternative order and as such any operational description of use should not be viewed as a limiting factor. The first step would, of course, be acquiring a model of the device 10 having the desired options and style to suit the user's taste.

The multiple-compartment configuration of the interior 22 allows the device 10 to perform multiple storage tasks. The cooler compartment 40 can be used to store various foodstuffs in a cold environment by placing ice or an ice/water mixture within the cooler compartment 40. The bait compartment 50, with the bait compartment insert 53 can be used to store either live bait or chum for the purpose of enticing game fish to place a hook into their mouth and subsequently be caught. Alternately, when the bait is expended or no longer deemed necessary, the bait compartment insert 53 may be emptied and used to store a portion of the catch as may fit in that volume.

The tackle box 60 can accommodate such items as lures, hooks, leaders, bobbers, and sinkers in any or all of the tackle box drawers 71. The previously mention items can be accessed by placing the device 10 on a fairly flat, level support surface; disengaging the door latch 65; opening the tackle box door 62; sliding the appropriate tackle box drawer 71 forward from the drawer insert 70 as shown in FIG. 8; raising the drawer lid 82; selecting the desired item; lowering the drawer lid 82 against the tackle box drawer 71; sliding the tackle box drawer 71 back into the drawer insert 70; closing the tackle box door 62; and engaging the door latch 65.

The device 10 can be transported from one location to another by picking the device 10 up by the carrying handle 31. The device 10 can also be moved about on the wheels 27 attached to the bottom 25 of the shell 21 by manipulating the extendable handle 112. The user can enjoy fishing activities while comfortably seated on the padded seat 44.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A cooler and tackle box, comprising:
    a cooler chest having a bottom conjoined with four sidewalls forming an open top and an interior cavity, said interior cavity having a vertical dividing wall forming a cooler compartment and a bait compartment which are both accessible from said top, said cooler chest further including a horizontal tackle box wall under said bait compartment forming a tackle box cavity, said cooler chest further including a tackle box opening providing access to said tackle box cavity;
    a tackle box door pivotally attached to said cooler chest for selectively closing said tackle box opening;
    a cooler compartment lid pivotally attached to said cooler chest and configured to selectively cover said cooler compartment;
    a bait compartment lid pivotally attached to said cooler chest and configured to selectively cover said bait compartment;
    a cushioned seat attached to a top surface of at least one of said cooler compartment lid and said bait compartment lid;
    a cooler compartment lid latch assembly attached to said cooler chest for selectively securing said cooler compartment lid closed;
    a bait compartment lid latch assembly attached to said cooler chest for selectively securing said bait compartment lid closed;
    a tackle box door latch assembly attached to said cooler chest for selectively securing said tackle box door closed;
    a tackle box configured to insert into said tackle box cavity; and,
    an extendable handle assembly, comprising:
        an external handle housing attached to said cooler chest, said handle housing having a handle slide way that passes through said handle housing to form an external top handle aperture and a bottom handle aperture;
        a slidable and extendable handle passing through said top handle aperture into said handle housing;
        a handle stop for limiting upward travel of said handle;
        a plug sealing said bottom handle aperture; and,
        an external seal over said top handle aperture.

2. The cooler and tackle box recited in claim 1, wherein said bottom and at least one sidewall of said sidewalls comprises a heat insulating material.

3. The cooler and tackle box recited in claim 1, wherein said cooler chest is provided with a drain for draining fluid.

4. The cooler and tackle box recited in claim 1, wherein said tackle box includes a drawer insert having a plurality of support posts affixed to said tackle box cavity; a pair of drawer slides suspended from said support posts; a tackle box drawer engaged with said pair of drawer slides; a tackle box handle disposed on said tackle box drawer, and a drawer lid pivotally attached to said tackle box drawer.

5. The cooler and tackle box recited in claim 1, wherein said drawer lid is provided with an offset configured to facilitate a finger hold for raising said drawer lid.

6. The cooler and tackle box recited in claim 1, further including a bait insert that acts as a tray for the bait compartment.

7. The cooler and tackle box recited in claim 1, wherein said cooler chest is contained in a molded shell.

8. The cooler and tackle box recited in claim 1, wherein said cooler compartment lid latch assembly includes a latch strike.

9. The cooler and tackle box recited in claim 1, further including a rod holder comprising a button disposed on a said cooler chest and an elastic tie affixed to said button and configured to form an encircling wrap.

10. The cooler and tackle box recited in claim 1, further comprising a wheel assembly on said bottom.

11. The cooler and tackle box recited in claim 10, further comprising a stand on said bottom.

12. A cooler and tackle box, comprising:
- a cooler chest having an outer shell, a bottom conjoined with four sidewalls forming an open top and an interior cavity, said interior cavity having a vertical dividing wall forming a cooler compartment and a bait compartment which are both accessible from said top, said cooler chest further including a horizontal tackle box wall under said bait compartment forming a tackle box cavity, said cooler chest further including a tackle box opening providing access to said tackle box cavity;
- a tackle box door pivotally attached to said cooler chest for selectively closing said tackle box opening;
- a cooler compartment lid pivotally attached to said cooler chest and configured to selectively cover said cooler compartment;
- a bait compartment lid pivotally attached to said cooler chest and configured to selectively cover said bait compartment;
- a cushioned seat attached to a top surface of at least one of said cooler compartment lid and said bait compartment lid;
- a cooler compartment lid latch assembly attached to said cooler chest for selectively securing said cooler compartment lid closed;
- a bait compartment lid latch assembly attached to said cooler chest for selectively securing said bait compartment lid closed;
- a tackle box door latch assembly attached to said cooler chest for selectively securing said tackle box door closed;
- a tackle box configured to insert within said tackle box cavity; and,
- wherein said outer shell includes an extendable handle assembly, comprising:
  - an external handle housing having a handle slide way that passes through said handle housing to form an external top handle aperture and a bottom handle aperture;
  - a slidable and extendable handle passing through said handle top aperture into said handle housing;
  - a handle stop for limiting upward travel of said handle;
  - a plug sealing said bottom handle aperture; and,
  - an external seal over said top handle aperture.

13. The cooler and tackle box recited in claim 12, further comprising a wheel assembly on said bottom.

14. The cooler and tackle box recited in claim 12, further comprising a stand on said bottom.

15. The cooler and tackle box recited in claim 12, wherein said cooler chest is provided with a drain for draining fluid.

16. The cooler and tackle box recited in claim 12, wherein said tackle box includes a drawer insert having a plurality of support posts affixed to said tackle box cavity; a pair of drawer slides suspended from said support posts; a tackle box drawer engaged with said pair of drawer slides; a tackle box handle disposed on said tackle box drawer, and a drawer lid pivotally attached to said tackle box drawer.

17. The cooler and tackle box recited in claim 12, wherein said drawer lid is provided with an offset configured to facilitate a finger hold for raising said drawer lid.

18. The cooler and tackle box recited in claim 12, further including a bait insert that acts as a tray for the bait compartment.

19. The cooler and tackle box recited in claim 12, wherein said cooler compartment lid latch assembly includes a latch strike.

20. The cooler and tackle box recited in claim 12, further including a rod holder comprising a button disposed on a said cooler chest and an elastic tie affixed to said button and configured to form an encircling wrap.

\* \* \* \* \*